(12) United States Patent
LaVallee et al.

(10) Patent No.: US 11,795,563 B2
(45) Date of Patent: Oct. 24, 2023

(54) SELECTIVE METALLIZED TRANSLUCENT AUTOMOTIVE COMPONENTS BY LASER ABLATION

(71) Applicant: LACKS ENTERPRISES, INC., Grand Rapids, MI (US)

(72) Inventors: Michael LaVallee, Grand Rapids, MI (US); David Walters, Grand Rapids, MI (US); Thomas Hawkins, Grand Rapids, MI (US)

(73) Assignee: LACKS ENTERPRISES, INC., Grand Rapids, MI (US)

( * ) Notice: Subject to any disclaimer, the term of this patent is extended or adjusted under 35 U.S.C. 154(b) by 226 days.

(21) Appl. No.: 17/154,805

(22) Filed: Jan. 21, 2021

(65) Prior Publication Data

US 2021/0222312 A1    Jul. 22, 2021

Related U.S. Application Data

(60) Provisional application No. 62/964,346, filed on Jan. 22, 2020.

(51) Int. Cl.
*B32B 3/30* (2006.01)
*C25D 5/56* (2006.01)
(Continued)

(52) U.S. Cl.
CPC ............ *C25D 5/56* (2013.01); *B23K 26/36* (2013.01); *B32B 3/30* (2013.01); *B32B 27/08* (2013.01);
(Continued)

(58) Field of Classification Search
CPC ........ B32B 3/30; B32B 15/04; B32B 2255/10; B32B 2255/205; B32B 2255/28; B32B 2451/00
See application file for complete search history.

(56) References Cited

U.S. PATENT DOCUMENTS

| 2018/0090831 A1 | 3/2018 | Frayer et al. |
| 2018/0195194 A1* | 7/2018 | LaVallee ................. B29C 45/16 |

(Continued)

FOREIGN PATENT DOCUMENTS

| DE | 102007015625 B4 | 10/2008 |
| DE | 102010016973 A1 | 11/2011 |

(Continued)

*Primary Examiner* — Elizabeth E Mulvaney
(74) *Attorney, Agent, or Firm* — Dickinson Wright PLLC

(57) ABSTRACT

A decorative component includes a plateable resin body portion that is light-transmissive. A thin intermediate layer of material is electrolessly deposited over the body portion. The intermediate layer is laser ablated to selectively remove the intermediate layer and expose the light transmissive portion. The part is then subjected to electroplating. The ablated areas do not receive the metal layers of the electroplating, thereby defining a pattern defined by the ablation. The laser ablation may define an outline, leaving the thin intermediate layer within the outline that is electrically isolated from areas outside of the outline. The electroplating process will not apply layers to the isolated areas, and the intermediate layer therein will dissolve, exposing the light transmissive body portion. An opposite side of the part is also exposed and transmissive, such that light will pass through the body portion and illuminate the pattern.

26 Claims, 10 Drawing Sheets

(51) Int. Cl.
    *B60Q 1/26*     (2006.01)
    *F21S 43/20*     (2018.01)
    *F21S 43/50*     (2018.01)
    *B60Q 1/00*     (2006.01)
    *B32B 27/08*     (2006.01)
    *C25D 5/02*     (2006.01)
    *C23C 18/16*     (2006.01)
    *C23F 4/00*     (2006.01)
    *B23K 26/36*     (2014.01)

(52) U.S. Cl.
    CPC ......... *B60Q 1/0035* (2013.01); *B60Q 1/2661* (2013.01); *C23C 18/1605* (2013.01); *C23C 18/1641* (2013.01); *C23C 18/1653* (2013.01); *C23F 4/00* (2013.01); *C25D 5/02* (2013.01); *F21S 43/26* (2018.01); *F21S 43/50* (2018.01); *B32B 2255/10* (2013.01); *B32B 2255/205* (2013.01); *B32B 2255/28* (2013.01); *B32B 2451/00* (2013.01)

(56) References Cited

U.S. PATENT DOCUMENTS

| | | |
|---|---|---|
| 2018/0305834 A1 | 10/2018 | Brockmann |
| 2019/0366912 A1 | 12/2019 | Verwys et al. |
| 2021/0207280 A1* | 7/2021 | Lavallee ................ C25D 17/08 |

FOREIGN PATENT DOCUMENTS

| | | |
|---|---|---|
| DE | 202015009357 U1 | 3/2017 |
| JP | H0790679 A | 4/1995 |
| JP | 2016060668 A | 4/2016 |
| WO | 2013083667 A2 | 6/2013 |
| WO | 2019173282 A1 | 9/2019 |

* cited by examiner

SELECTIVE METALLIZED TRANSLUCENT AUTOMOTIVE COMPONENTS BY LASER ABLATION

CROSS-REFERENCE TO RELATED APPLICATIONS

This application claims the benefit of previously filed U.S. Provisional Patent Application No. 62/964,346, filed Jan. 22, 2020, the entire content of which is hereby incorporated by reference in its entirety.

FIELD OF THE DISCLOSURE

The present disclosure is related to decorative components in markets including automotive, appliance, consumer electronics, and the like. More particularly, the present disclosure is related to components with plated decorative chrome finishes, such as grille assemblies for automotive vehicles.

BACKGROUND OF THE DISCLOSURE

Plated decorative chrome finishes have been commercially available for various products in the automotive, appliance, consumer electronics, and other markets for many years. As technologies and consumer tastes have matured, the desire for more complicated parts and designs has evolved. It has become more desirable to incorporate multiple functions into a single component as a way of adding an aesthetic quality with fewer manufacturing steps.

DE 202015009357U1 describes an invention in which a metallized plastic component includes a base body of at least one translucent plastic on which a metal layer is applied. At least one separate transilluminable structure is inserted into the base body. The transilluminable structure is formed by a region of the metal layer in which light-transmissive openings are arranged in a dot matrix. The base body in this case is described as having at least one or more layers of translucent plastic. A standard stack of electroplated layers with chrome are disposed on top. Holes in the plated layer allow light to pass through when an illumination source is lit on the back side of the main body. The specification calls out metallization being done by either using a standard plating on plastic technique or to a PVD process. In the case of standard electroplating, a base body containing a single plateable and translucent composition is by definition covering both the front and back side of the part. An extra step or some type of masking during plating to inhibit the electroplating from forming on the back side is required, adding cost and complexity. Without these extra steps, the light source would not transmit through the bottom and through the holes in the top.

DE102007015625B4 discloses the use of a single translucent plateable plastic to metallize a component and uses laser ablation to create a decorative display element on the front surface, but does not use laser ablation to remove the plating from the back side. This disclosure describes using masking or shielding to prevent plating from building up in the first place on the single plastic piece. These types of masking or shielding systems typically take up space on the rack tooling and add expense.

In view of the above, improvements can be made in the selective metallization of plateable plastic bodies.

SUMMARY OF THE DISCLOSURE

The present disclosure relates to a selectively metallized plastic substrate with a translucent plastic substrate. The final part includes a portion or portions of the back side unplated while the front surface has plating removed by laser ablation resulting in a graphic pattern of holes, lines, or continuous areas of no plating. When a light source is placed behind the article, the resulting visible radiation will transmit through the unplated portions of the article resulting in a state where these unplated areas on the front side are illuminated. Conversely, when the light source is not lit, the unplated areas will appear dark. It will be appreciated that the ablation process is capable of producing features that can produce graphic image outlines, dots, or lines. The dots or lines may be combined together to create the graphic outlines or the dots and lines may remain discrete. It is another aspect to arrange the dots or lines in arrays to create a dot matrix effect that from a distance will create a pattern or image that is perceived by the viewer. These types of lighting displays are of particular interest to designers in the automotive industry for use as buttons, knobs, or larger decorative displays for dashboards, consoles, and door assemblies. These components may also be used on the exterior parts of a vehicle, including but not limited to, use around mirror assemblies, door handles, rear deck strips, front end grille assemblies, and the like.

According to an aspect, a decorative component in the form of a grille assembly for a vehicle includes: a plateable body portion formed of a plateable resin material capable of being electroplated, wherein the plateable resin material is translucent and light-transmissive; an electroless intermediate layer plated on the plateable resin via electroless deposition; a pattern having an outline formed in the electroless intermediate layer; an electroplated layer of material defining a surface finish, wherein the electroplated layer of material overlies the electroless intermediate layer in areas outside of the outline, wherein the pattern is defined within the surface finish; wherein the outline defines an enclosed shape, wherein the enclosed shape exposes the plateable resin; a bare section defined within the surface finish, wherein light is transmitted through the bare section, through the plateable resin material, and through the pattern to illuminate the pattern.

In one aspect, the outline defines at least one closed loop, and no surface finish is present within the closed loop of the outline.

In one aspect, the component includes a front side and a back side, wherein the front side includes the pattern and the back side includes the bare section.

In one aspect, the bare section of the back side is larger than the pattern on the front side.

In one aspect, the pattern includes multiple outlines defining multiple closed-loops, wherein no surface finish is disposed within the multiple outlines.

In one aspect, the pattern includes a plurality of features having a width or diameter less than 60 microns.

In one aspect, the decorative component includes a non-plateable resin portion embedded in the plateable resin body, wherein the non-plateable resin portion is translucent and light-transmissive.

In one aspect, the plateable resin body is overmolded on the non-plateable resin portion, and the non-plateable resin portion is disposed on the back side of the component and the pattern is disposed on the front side of the component, such that a light disposed adjacent the non-plateable resin portion will illuminate the pattern on the front side.

In one aspect, the metal layer and surface finish do not cover the non-plateable resin portion.

In one aspect, the pattern includes openings through the metal layer of various sizes or shapes.

In one aspect, the component includes at least one reflector embedded within the body portion, wherein the reflectors are configured to reflect light transmitted through the body toward the pattern to illuminate the pattern.

In another aspect, a method of making a decorative component includes: providing a plastic plateable resin body portion that is translucent and light-transmissive; performing electroless deposition on the body portion and covering the plateable resin body portion with an intermediate layer of material, wherein the intermediate layer is configured to be electroplated; ablating the intermediate layer with a laser, wherein the laser defines a pattern, wherein the laser defines an outline that exposes a portion of the body portion through the intermediate layer; performing an electroplating process on the body portion having the intermediate layer of material; during the electroplating process, removing the intermediate material disposed within the outline, wherein the intermediate material within the outline is electrically isolated relative to areas outside of the outline; electroplating a metal layer over the areas outside of the outline; defining a pattern within the metal layer, wherein the pattern corresponds to the outline defined by the laser; defining a bare section within the metal layer; wherein the pattern exposes the body portion through the metal layer, such that light passes through the bare section and the body portion to illuminate the pattern through the metal layer.

In one aspect, the pattern is defined on a first side of the body portion, and the bare section is defined on a second side of the body portion opposite the first side, wherein a light disposed adjacent the second side illuminates the pattern on the first side.

In one aspect, the method includes embedding a non-plateable resin portion in the plateable resin portion, wherein the non-plateable resin portion is exposed and translucent, wherein the electroless deposition does not cover the non-plateable resin portion.

In one aspect, the component is attached to a plating rack prior to electroless deposition, and the component remains fixed to the plating rack after electroless deposition and through the electroplating.

In one aspect, the intermediate layer within the outline is electrically isolated from the areas outside of the outline and the intermediate layer within the outline is dissolved by acid during the electroplating process to define the pattern.

In one aspect, there is no metal layer within the outline following the electroplating process.

In one aspect, the laser defines the outline of a shape of the pattern and removes a perimeter of the pattern, leaving the intermediate layer within the outline prior to the electroplating, wherein the intermediate layer within the outline is removed after laser ablation during the electroplating.

In one aspect, the pattern includes multiple outlines defined by the laser and defining multiple closed loops, with multiple electrically isolated portions of the intermediate layer within the closed loops following laser ablation, wherein the areas within the closed loops are dissolved during electroplating to define the pattern.

In one aspect, the method includes overmolding the plateable resin portion onto the non-plateable resin portion.

In one aspect, a first side of the component is laser ablated to define the pattern, and a second side of the component opposite the first side is not laser ablated.

In one aspect, the method includes applying a resist material on the second side of the component prior to performing electroless deposition, wherein surface area covered by the resist material does not receive the intermediate layer of material.

In one aspect, the method includes applying a clear or tinted coating over at least the front side of the part after electroplating the metal layer.

In one aspect, the method includes embedded at least one reflector within the body portion, wherein the reflector directs light being transmitted through the body portion toward the pattern formed in the metal layer

BRIEF DESCRIPTION OF THE DRAWINGS

The drawings described herein are for illustrative purposes only of selected aspects and not all possible or anticipated implementations thereof, and are not intended to limit the scope of the present disclosure.

DETAILED DESCRIPTION OF THE DISCLOSURE

Figure 1:
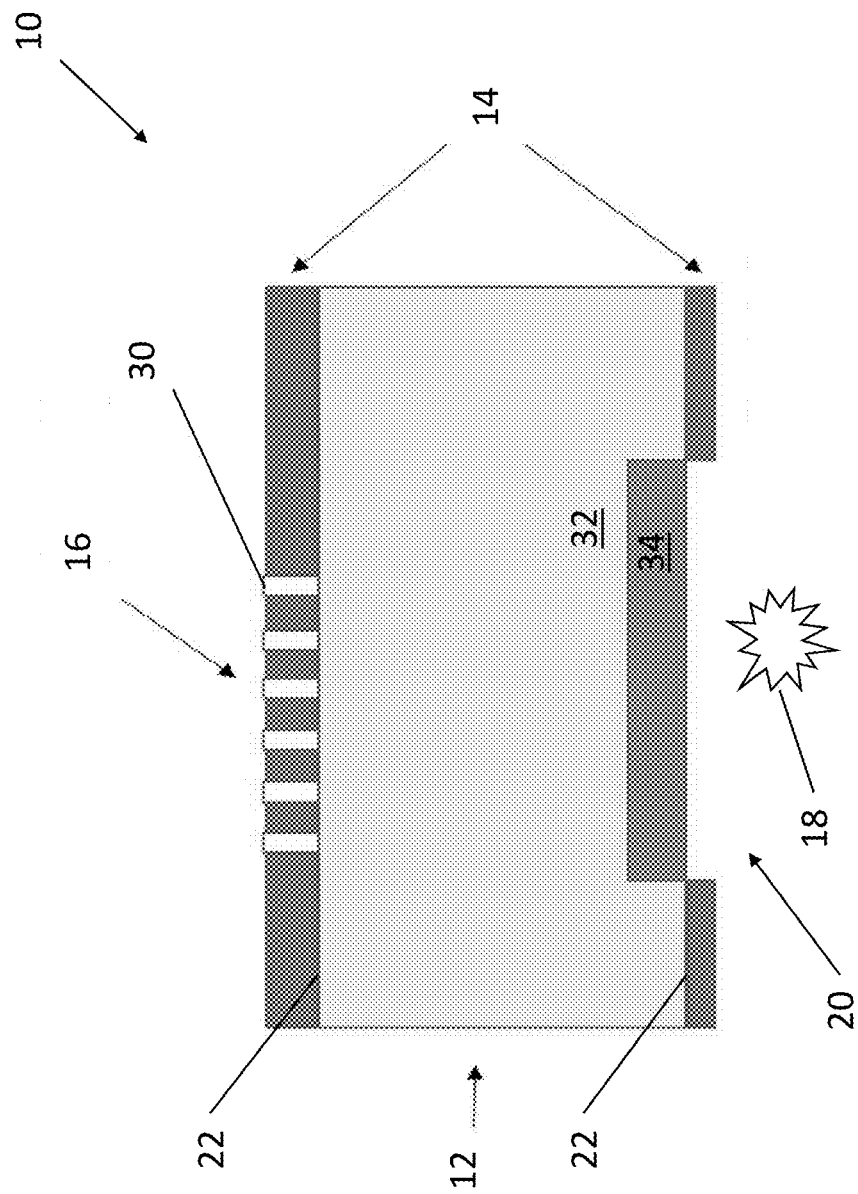
FIG. 1 is a cross-sectional schematic view of a plated part having a pattern of openings on a front side and an opening on a back side through which light can be transmitted through the body and out of the pattern according to an aspect of the disclosure.

With reference to FIG. 1, a decorative component or part 10 includes a molded body 12 of plateable translucent plastic that has a base metal layer 14 deposited thereon. The part 10 may be selectively metallized by removing metallized areas of the base metal layer 14 by laser ablation to define a pattern 16 or the like having light transmissive qualities. It will be appreciated that reference to the pattern 16 need not technically be a pattern, but can be any design or illustration, and may be at fixed repeated intervals or randomly spaced, and can be any shape defined by a contrast between the metal layer 14 and the areas of the metal layer 14 that are removed. FIG. 1 also illustrates an optional aspect of the disclosure, with a separate piece embedded in the plastic body 12 on the back side of the part corresponding to the bare section 20. This aspect will be described in further detail below. It will be appreciated that this embedded piece may be excluded from FIG. 1, with the plastic body 12 being a single unitary piece. The part 10 may be in the form of a grille assembly for a vehicle, for example. The part 10 may also be used as a decorative component for other vehicle structure, according to another aspect of the disclosure.

In one aspect, the part 10 may be plated with a number of layers that combine to define the overall metal layer 14 as part of a decorative chrome plating process applied to the plastic body 12. An intermediate layer 22 may be disposed on the body 12, with the remaining layers disposed over the intermediate layer 22. The intermediate layer 22 may be deposited via an electroless plating process, and additional layers may be applied to the intermediate layer 22 via electroplating. The selected areas for removal may be applied to one side or surface (i.e. the front) of the part 12, and are done in such a way as to form the decorative pattern 16, symbol, icon or the like. The areas for removal may be defined prior to applying the layers over the intermediate layer 22, such that metal layers are not built up in the area where the intermediate layer 22 was removed. The removed areas of the metal layer 14 may also include a bare section 20 on the back side of the part, through which light may be transmitted.

In one aspect, the laser ablation technique can be used to form individual dots that can be arrayed in the form of a dot matrix pattern to give the sense of a larger image much like a dot matrix image is created in a newspaper. Designs can also be created using lines defined by the laser ablation. Additionally, larger areas of bare plastic can also be exposed through the laser ablation technique to expose plastic of virtually any shape, such that the laser ablation is not limited to small dots, lines, or the like.

In one aspect, the back side of the part 10 may have most of the plating (or intermediate layer 22) removed via laser ablation, thereby leaving a large area of exposed bare translucent plastic resin of the body 12. In one aspect, when a light source 18 is illuminated behind the part 10 (such as adjacent the back side), light is allowed to pass through the back side of the part 10 and out through translucent plastic body 12, and through the pattern 16 defined in the metal layer 14 on the front side of the part that was defined by the laser ablation.

Additional details regarding the plating process and definition of the pattern 16 for the part 10 will be provided below.

Figure 2:
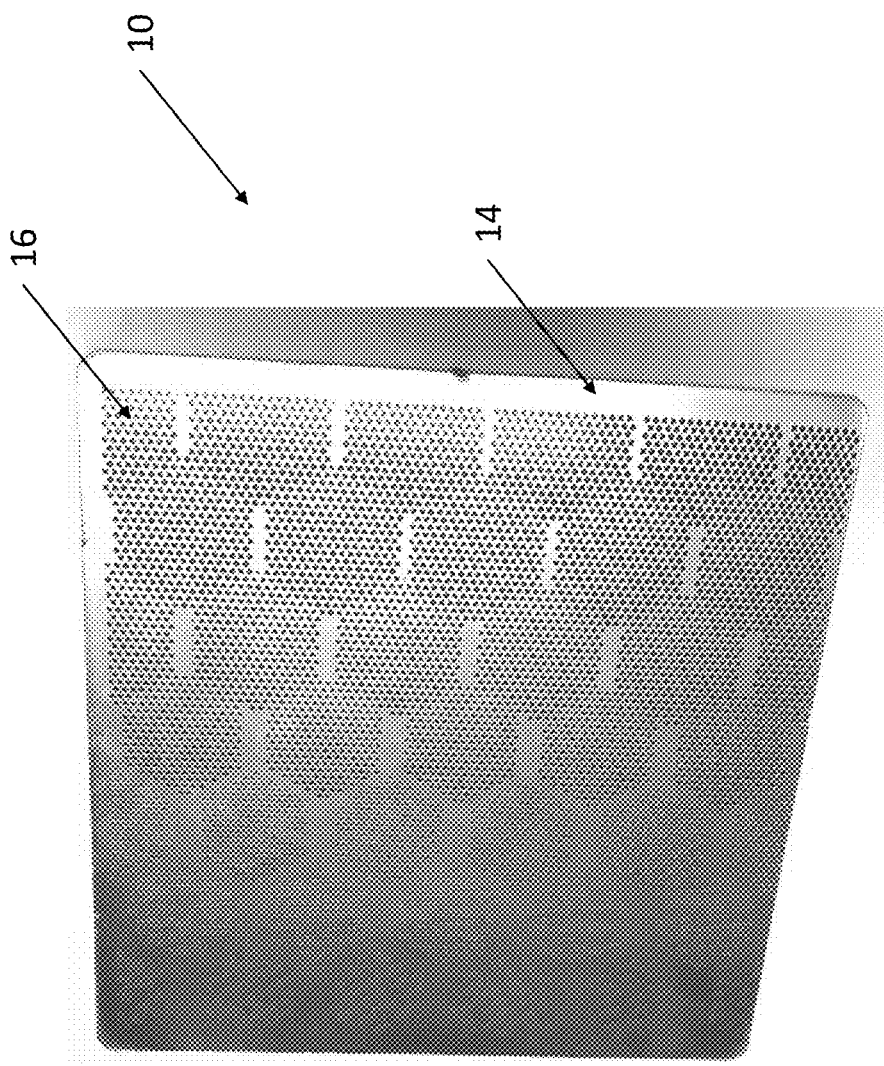
FIG. 2 is a perspective view of a part having a pattern on a front side created via laser ablation according to an aspect of the disclosure.

FIG. 2 illustrates one example of a part 10 (showing the front side) having a pattern 16 defined in the metal layer 14 on the front side of the part 10. The part 10 includes the metal layer 14 in the form of metallized chrome, which may include multiple layers of metal and the like used to create metalized chrome as known in the art, such that further details of the metalized chrome layering process need not be discussed in further detail.

As shown in FIG. 2, the front side of the part 10 includes a plurality of holes that combine to define the pattern 16. The holes are created via laser ablation, which removes the metal layer 14 in a specified location. As described in further detail below, the intermediate layer 22 may be removed via the laser ablation such that the additional layers build up over the non-removed area to define the overall metal layer 14.

The plurality of holes combine to define the pattern 16 in FIG. 2, which have generally hexagonal shapes of varying size. For example, the size of the hexagonal shapes reduces from right to left. FIG. 2 further illustrates sections that are disposed between the various holes making up the hexagonal patterns 16. The metal sections, in contrast to the hexagonal shapes, get larger from right to left. It will be appreciated that various other relative shapes and sizes of the patterns 16 and metal sections can be created, as the metal sections are generally a "negative" of the "positive" shape of the patterns 16 that are disposed across the front side of the part 10.

Figure 3:
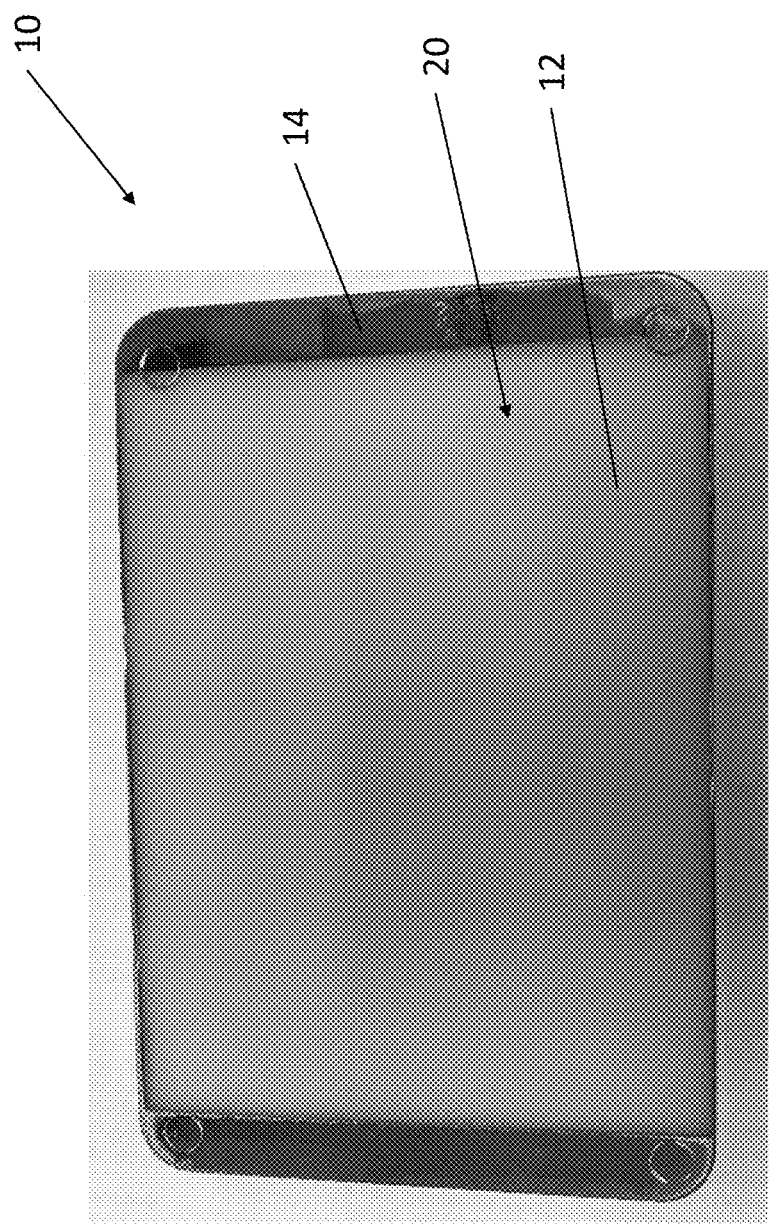
FIG. 3 illustrates the back side of the part of FIG. 2.

FIG. 3 illustrates the back side of the part 10 of FIG. 2. As shown in FIG. 3, bare section 20 is defined across a majority of the back side of the part 10. The bare section 20, like the holes on the front side defining the pattern 16, may be created via laser ablation, which defines the removed shape of the metal surface 14 from the back side to define the bare section 20. The bare section 20 may also be considered a portion of the plastic body 12, as the plastic body 12 is exposed through the bare section after the metal layer 14 has been removed. As described above, the metal layer 14 may be removed by laser ablation to expose the plastic body 12 and define the bare section 20.

The bare section 20, being an exposed portion of the translucent plastic body 12, therefore is configured to allow light to be transmitted therethrough, such that the patterns 16 on the front side (FIG. 2) will become illuminated in response to activating a light source 18 on the back side of the part adjacent the bare section 20.

Figure 4:
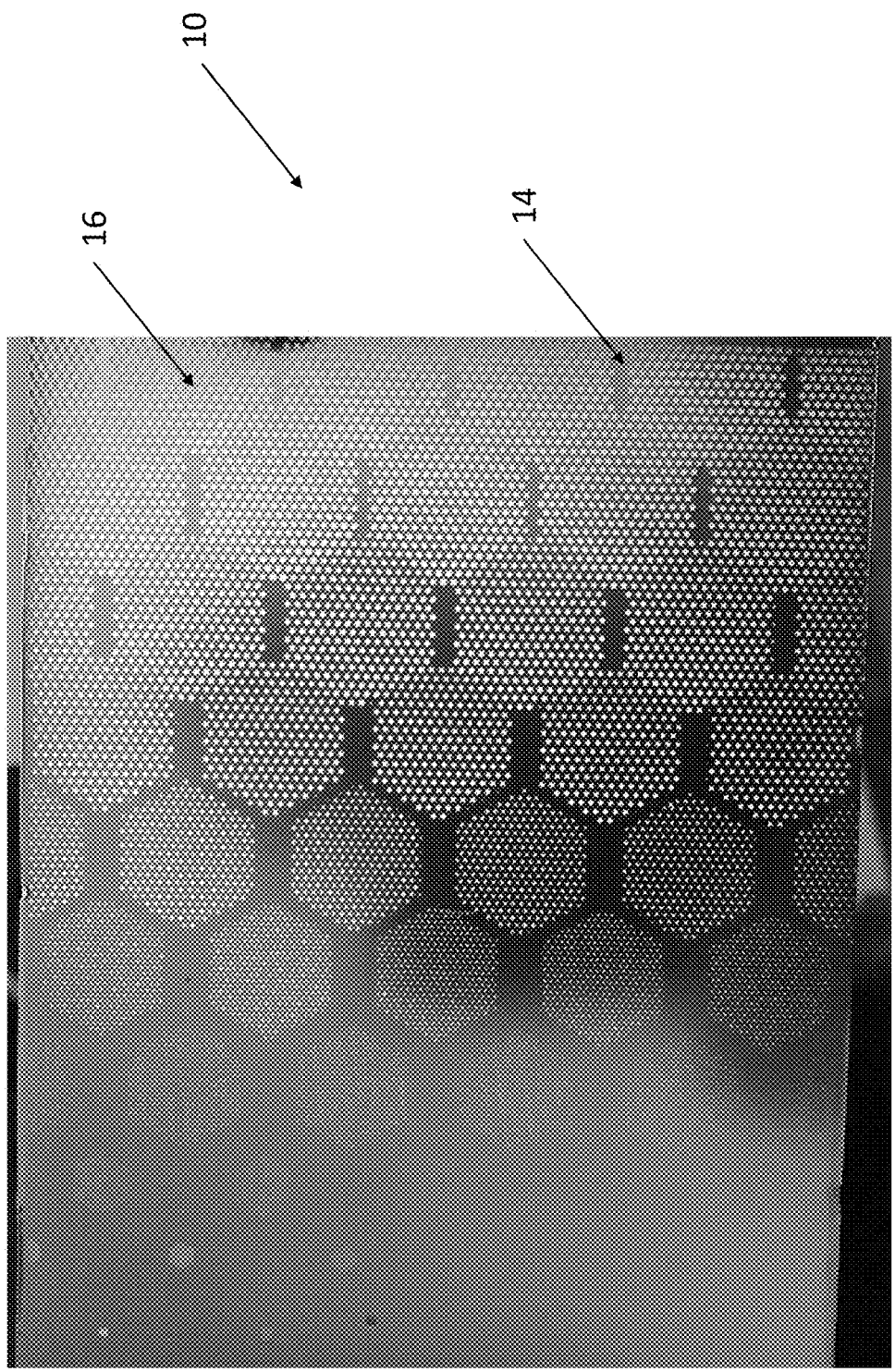
FIG. 4 illustrates another part with a pattern defined by laser ablation with the pattern illuminated according to an aspect of the disclosure.

FIG. 4 illustrates the front side of the part 10 again, now with one or more of the patterns 16 illuminated in response to activating a light source on the back side. As shown in FIG. 4, the light source 18 is not visible, because it is behind the part 10. In one aspect, light from the light source 18 may propagate through the plastic body 12, because the plastic body 12 is light transmissive. Accordingly, areas of the part 10 located away from the light source 18 may still be illuminated. However, it is possible that areas located away from the light source 18 may have an illumination that is less intense than areas closer to the light source 18.

For example, if the light source 18 is located behind the part 10 in the upper right corner, the intensity of the light may be higher in the upper right corner, but light may still shine through in the lower left corner.

According to an aspect, the part 10 shown in FIG. 4 has a pattern 16 of laser ablated areas that get smaller from right to left on the part 10. The smallest spot size (the size of the laser that creates the holes) on the part 10 can represent an ablated area of 60 microns. All ablated areas on the part 10 may be able to transmit light. It is possible to use even smaller spot sizes and make ever more intricate designs. The laser is capable of producing a spot down to 30 microns in diameter. As shown in FIG. 4, as the patterns 16 change near the left of FIG. 4, the metal layer 14 areas between the patterns 16 increase in size, further illustrating the negative/positive relationship between the patterns 16 and the metal layer 14. It will be appreciated that a variety of other spot sizes may be employed.

Figure 5:
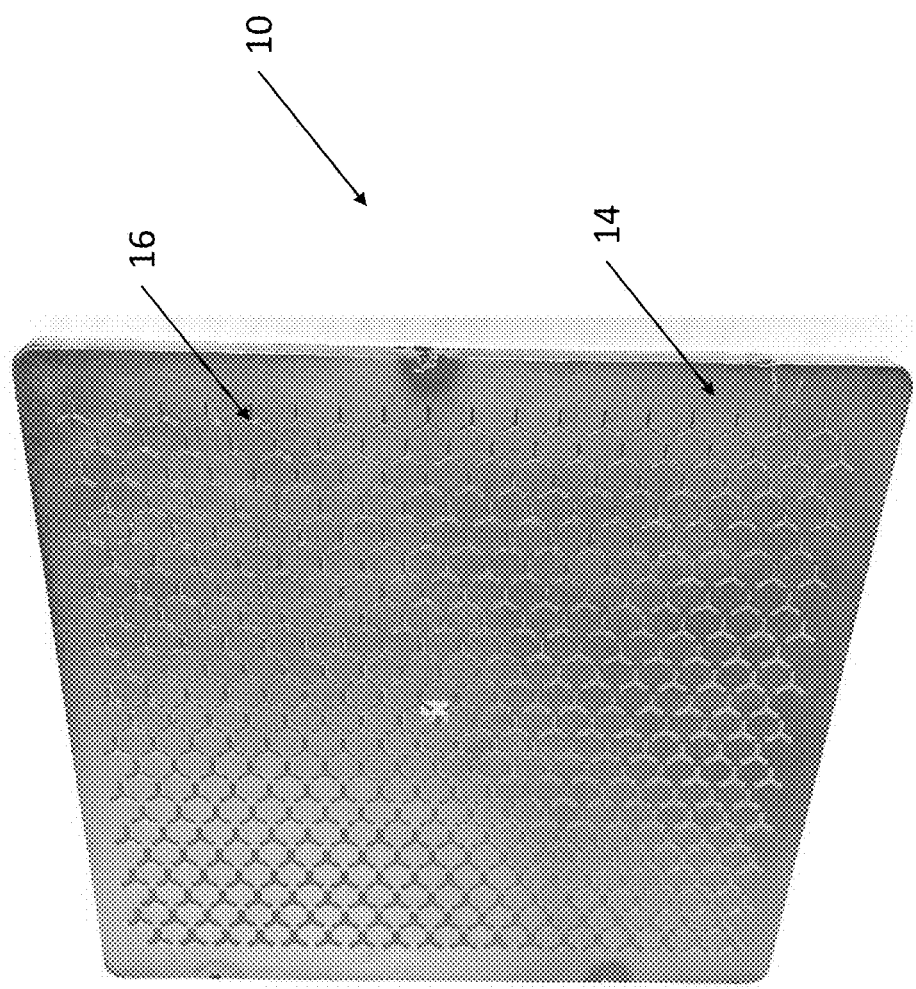
FIG. 5 is a perspective of another part having a pattern on the front side according to an aspect of the disclosure.
Figure 6:
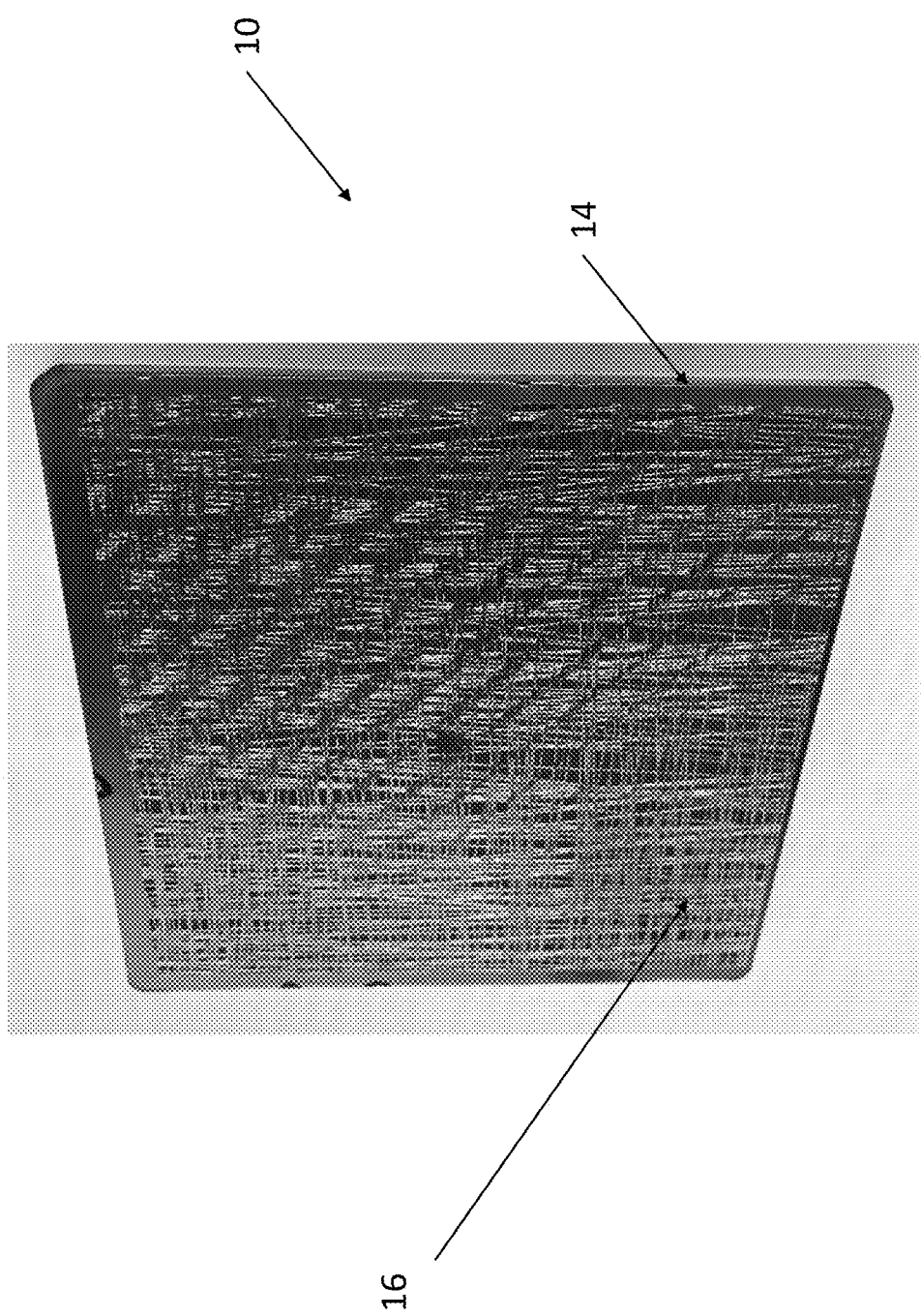
FIG. 6 is a perspective view of yet another part having a pattern on the front side according to an aspect of the disclosure.
Figure 7:
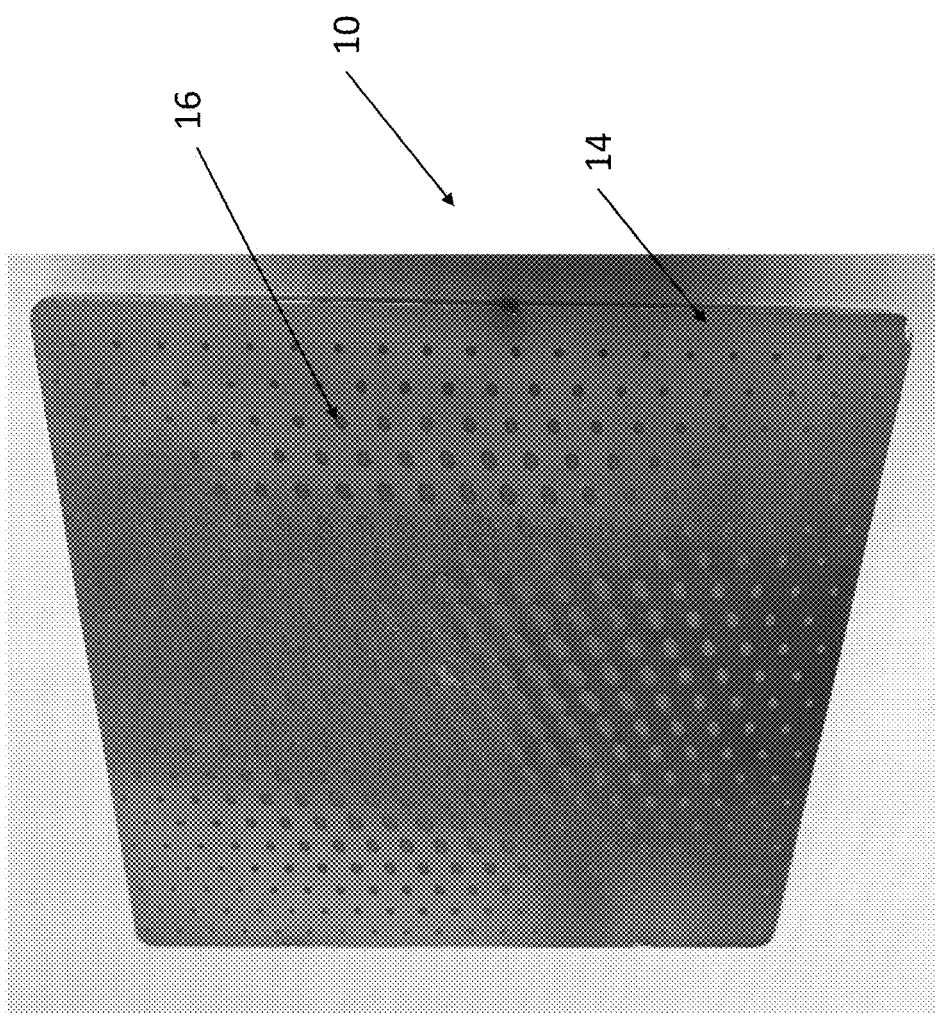
FIG. 7 is a perspective view of yet another part having a pattern on the front side according to an aspect of the disclosure.

As previously discussed, the pattern 16 formed by ablating areas can take the form of virtually any shape or design. Additional examples are shown in FIGS. 5-7. Throughout the figures, it will be appreciated how intricate lines of various widths and direction can be created using this technique.

FIG. 5, for example, illustrates a plurality of Y-shaped patterns 16. FIG. 6 illustrates a plurality of elliptical shapes of various sizes for the patterns 16. FIG. 7 illustrates a crisscross pattern 16 of lines that appear to be randomly etched across the surface of the part 10.

Turning now to more specifically describe the process, according to an aspect, the process for making the part 10 involves molding the plastic body 12 using a plateable resin such as ABS or PC/ABS. The part 10 may be subjected to a standard non-electrolytic plating process (electroless plating) through the step of depositing an electroless nickel or copper layer. The electroless stage of the process may be referred to as process stage 102, illustrated in FIG. 8. Stage 102 may include the following steps: Cr acid etch, Neutralizer, Catalyst, Accelerator, and Electroless Cu or Ni.

At this point, at the end of stage 102, the part 10 has only the very thin intermediate layer 22 of metal on the plastic body 12. The thin intermediate layer 22 can be a few tenths of a micron in thickness which is sufficient to carry an electric charge. The part 10 is subjected to a laser with sufficient power to ablate the thin intermediate layer 22 of electrolessly deposited metal in the desired areas, thereby removing the layer 22 and exposing portions of the plastic body 12 and defining a shape of the pattern 16.

The part 10 is then plated through the electrolytic portion of a standard chrome plating process, which may be referred to as process stage 104, leaving the part 10 with a chrome finish in the form of metal layer 14 and open areas (such as holes, lines, or the like) that define pattern 16 such that light can transmit out through the front side via the defined patterns 16. Stage 104 may include the steps of: Cu Strike, bright Acid Cy, Semi-bright no, Bright No or low gloss Ni, Microporous Ni, and Cr.

Figure 8:
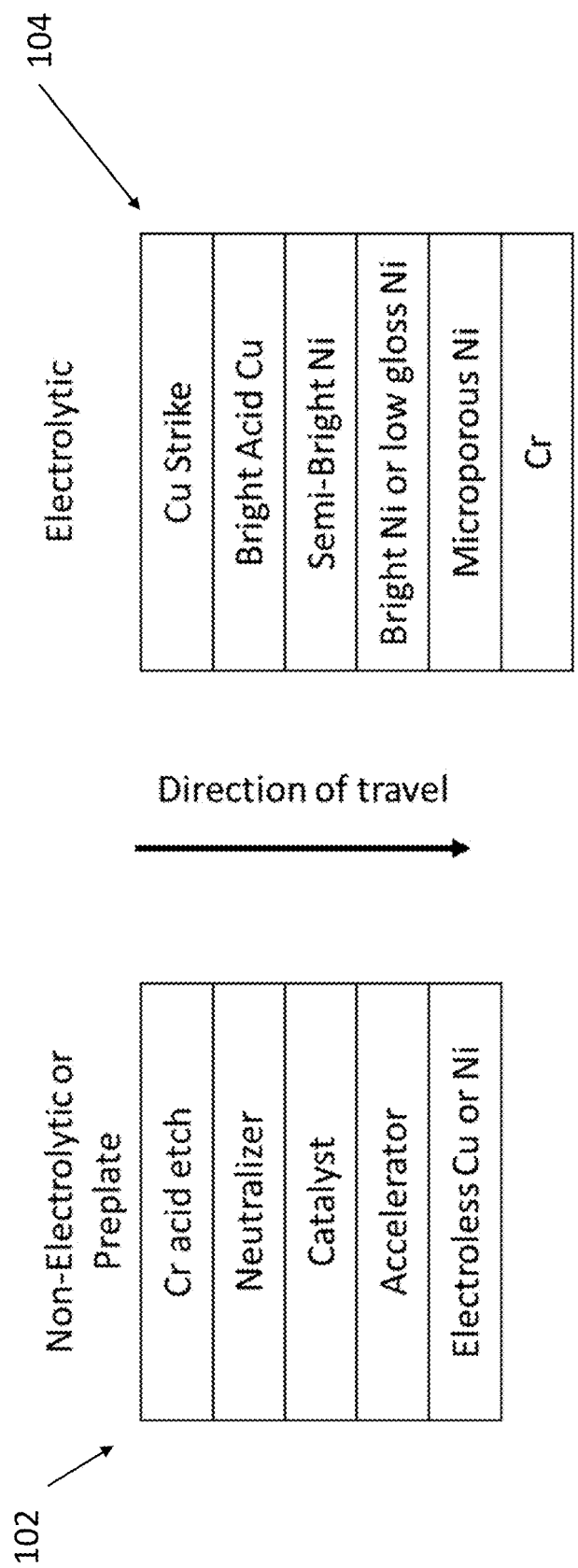
FIG. 8 illustrates a progression of steps for a plating on plastic process according to an aspect of the disclosure.

With reference to FIG. 8, the part 10 may be removed from the traditional plating line between stage 102 and 104. The part 10 may be removed from the line after the Electroless Cu or Ni step (the step that adds the thin intermediate layer 22 at the end of stage 102), and the part 10 may then be subjected to the laser ablation step. This laser ablation step therefore occurs between stage 102 and stage 104. Following the ablation step, the part 10 may then inserted be back into the plating line where it continues down the Electrolytic portion of the line (stage 104) to receive the additional metal layers including the final chrome layer that combine to define the metal layer 14. It should be noted that the finish is not exclusive to bright chrome but also to lower gloss finishes such as satin chrome. The chrome finish is not limited to deposits from hexavalent chrome solutions, but also those from trivalent chrome solutions. Furthermore the trivalent finishes can be of any color including very dark finishes. It will be appreciated that the reference to the metal layer 14 also includes these various possible metal layers and finishes. It will also be appreciated that other metal finishes may be employed.

The laser ablation process or step, performed between stage 102 (the electroless deposit) and stage 104 (the electrolytic portion), may be performed on both sides of the part 10 (back side and front side) to allow light transmission therethrough, as described above.

In one aspect, it is not necessary to ablate all of the electrolessly deposited thin metal layer 22 from the desired area, in particular on the back side, such as the bare section 20 described above. Rather, in one aspect, the laser may form an outline 24 of the bare section 20, with the outline 24 being ablated. This outline 24 must be complete (in the form of a closed loop) and allow for no bridging of residual metal to the un-ablated areas outside the form or polygon of the outline 24. Put another way, if the outline is circle, the material left inside the circle does not make contact with the material outside of the circle. Rather, the laser ablation removes the material between the inside area and the outside area and defines the shape of the outline 24.

The area inside the outline 24 is therefore electrically isolated from the rest of the part 10 and will receive no current as it goes through the remainder of the electrolytic metal depositions when the area outside is in the circuit. The electrically isolated section (such as the area inside the outline 24), which receives no current, therefore does not receive the additional metal layers or finish that are applied during the electrolytic stage that forms the metal layer 14. The metal layer 14 builds up in the area outside the outline 24 that is part of the circuit. The ablation outline technique may be used on both sides of the part 10. A plurality of electrically isolated sections may correspond to the patterns 16 described above, which can have various shapes.

Because the metal coatings inside of these isolated areas are very thin (in the form of the thin intermediate layer 22) the areas inside the outline 24 are subject to dissolution in acid media such as a solution. The Cu strike and Bright Acid Cu tanks (performed at the beginning of the electrolytic stage of the process as shown in FIG. 8) are acidic and capable of removing the thin intermediate layer 22 of electroless metal deposits that are electrically isolated inside of the outline 24. This technique is therefore advantageous in this process because it reduces the amount of time it takes to ablate metal, and further reduces the opportunity to damage the plastic by having too much radiation potentially scorching the resin surface. Accordingly, ablating the outlines 24 of the patterns 16 saves time and cost and provides an improved part.

Figure 9:
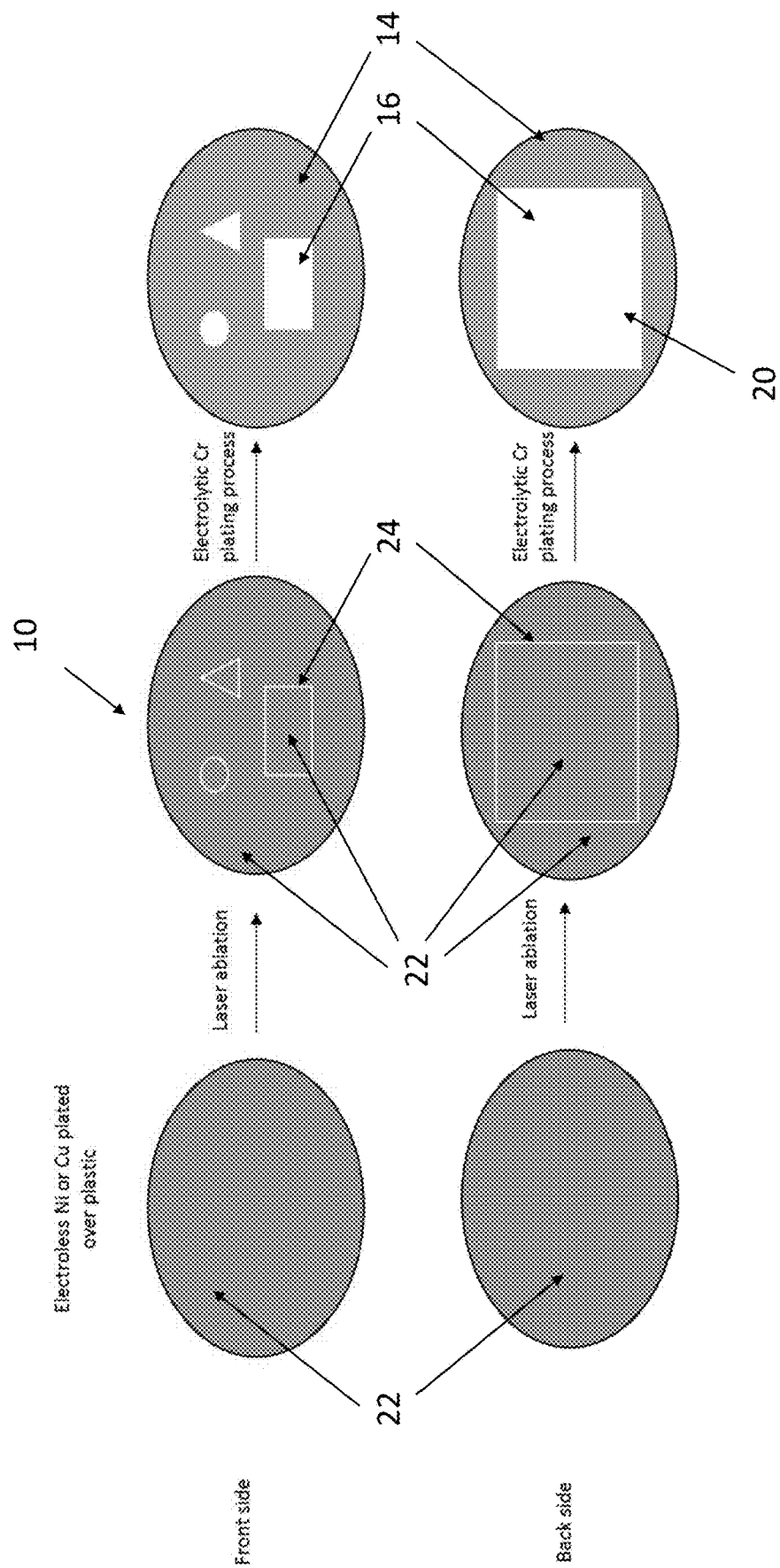
FIG. 9 is a schematic view of the front and back sides of a part progressing through the plating and laser ablation steps according to an aspect of the disclosure.

An illustration of the ablation stage of the process is shown in FIG. 9, which illustrates both the front and back side of the part 10 undergoing the plating process. On the left side of FIG. 9 the part 10 is illustrated following stage 102 after electroless deposition of the thin layer 22.

As shown in FIG. 9, both the front side and back side are illustrated schematically. The intermediate layer 22 has been applied to the plastic body 12 of the part 10, essentially completely covering the entire part 10 on both sides. If the part were to be subjected to the electrolytic stage at this point, the entire part would be covered in the metal layer 14 having the finish corresponding to the particular electrolytic process being performed.

However, as shown in FIG. 9, laser ablation is performed on the thin intermediate layer 22, thereby creating various shapes. On the back side, a rectangle outline 24 is defined. As shown in the middle views of FIG. 9, the layer 22 remains within the outline 24, not having been ablated or otherwise removed.

Similarly, on the front side, various other outlines 24 are defined having different shapes to define different patterns 16. For example, an oval, triangle, and elongate rectangle are shown in outline 24 form. Like the outline 24 on the back side, the outlines 24 on the front side still include the layer 22 inside of the outline 24.

Following definition of the outlines 24, the electrolytic stage 104 shown in FIG. 8 is applied to the part 10. The material of the intermediate layer 22 within the outlines 24 is removed by the acid exposure, as described above, and the areas outside of the outline 24 are subjected to the current of the electroplating process and receive the metal plating layers to define the desired finish and the overall metal layer 14. Thus, as described above and illustrated, there is more surface area initially covered in stage 102 than metal layer 14 that builds up in stage 104, due to portions of the layer 22 being removed and/or electrically isolated from the area of the part that ultimately corresponds to the desired surface coverage of metal layer 14.

In another aspect, it is possible to lay down a bead of etch resistant, non-plateable material along the outline 24 of the area where it is desirable not to have plating on the back side of the part 10. This bead of material may also be referred to a "resist material" because such material resists plating. Similar to laser ablation, this application of resist material creates a window or outline 24 of selective plating on the back side, but without having to use a laser on this portion of the part 10. Because the intricate patterns 16 on the front side are formed with laser ablation, which provides more fine control, the laser ablation step can be performed without having to take the parts 10 off the plating rack and flipped or oriented such that both sides can face the laser. The back side of the part 10, not necessarily needing the fine control of the laser to create the generally simple bare section 20, can remain facing away from the laser. The outline 24 on the back side formed by the bead of non-plateable material blocks deposition of the layer 22, and can still allow deposition of the layer 22 inside the outline 24 defined by the bead. Thus, the appearance of the outline 24 in the middle of FIG. 9 would apply to this procedure. Similar to the laser ablation described above, the bead need not cover the entire area that is to be the bare section 20, because the area internal to the outline 24 will dissolve in response to the acid and electric isolation.

The use of a non-plateable bead to define the outline 24 on the back side can save on labor costs related to having to unrack and rerack the parts 10 and potential scrap that is created by the extra handling of sensitive parts. The electroless deposits that are formed inside the etch resistant, non-plateable bead are still electrically isolated by the outline 24 and will be dissolved in the acidic tanks in subsequent steps as described above.

In yet another aspect, it is may be advantageous to apply a clear or tinted coating 30 (see FIG. 1, but applicable to the other parts 10 described and shown herein) over the front side of the part 10. The coating 30 can be colored to provide an aesthetic quality and it can also provide protection to the exposed transmissive plastic regions of the patterns 16 that have been created by the selective metallization process. The properties of the coating 30 can be optimized for adhesion, durability, weathering, and corrosion properties to both the metal and plastic interfaces. The application of the coating 30 may be advantageously performed on the part 10 of the present disclosure relative to two-shot molded constructions of plateable and non-plateable portions. In such two-shot molded parts, the interface created between plateable and non-plateable resins can define a gap due to imperfections in how the different resin types fit or line up with each other. Paint can fill this gap between the resin types, and such paint does not volatize easily during the flash step of the plating process. Accordingly, the solvent can completely evaporate during the curing step. The excessive amount of solvent that leaves the part after the outer film formation has been set can cause a volcanic-like defect referred to as "solvent pop." This is problematic on a decorative surface of a part intended to provide an aesthetically pleasing appearance. The process of the present disclosure, however, does not have this problem, because the laser ablated part 10 described herein does not have a similar imperfection at an interface between plateable and non-plateable resins, and therefore does not absorb paint within a gap that has trouble volatizing. Thus, the present disclosure provides advantages relative to the prior solution.

In another aspect, with reference again to FIG. 1, the process may include, optionally, overmolding a plateable resin 32 around or on a thin, clear, transmissive, non-plateable resin piece 34, which defines the overall plastic body 12. In one aspect, a suitable material for the non-plateable resin 34 may be polycarbonate but other resins that retain clarity and are inert to the plating process could be used. The non-plateable resin 34 could be either stamped to the desired shape from a film or thin sheet stock or molded to a specific shape. This piece of non-plateable resin 34 may then be placed into a mold either as an insert or held in place with a vacuum. The plateable resin 32 may then be molded around and onto the non-plateable portion 34. The non-plateable portion 34 is exposed on the back side and not covered by the plateable resin 32 in the area where light is to be transmitted to the plastic body 12. The non-plateable portion 34 is large enough to allow enough light through the back side to properly illuminate the patterns 16 defined on the front side.

The process of plating the plateable portion 32 is the same as previously described. The plateable portion 32 receives the intermediate layer 22 thereon. The non-plateable portion 34 does not receive the intermediate layer 22, thereby leaving a blank/open area (defining the bare section 20) within the plateable portion 32 on the back side of the part 10. The front side of the part 10 may be laser ablated as previously described (for example, by using outlines 24 of the desired shapes), and the formation of the metal layer 14 proceeds after the ablation.

Similar to procedures described above, with the back side already having bare section 20 within the plateable portion 32, the part 10 does not necessarily have to be removed from a plating rack to expose the back side to the laser. Rather, the ablation may be limited to the front sides of the parts 10 undergoing the process, and the parts 10 may stay disposed on a plating rack or the like. In this approach, laser ablation or applying a bead in the shape of an outline on the back side is not necessary.

The overmolded non-plateable portion 34 will not need ablation of the back side because the clear transmissive piece 34 by definition does not develop any electrolessly deposited metal. Without electrolessly deposited material, current does not pass through this portion 34, and the additional layers of the metal layers 14 will not develop. As stated previously, the advantage of this embodiment is it precludes the need to unrack the part during the ablation step and the subsequent rerack of the part onto the plate rack tooling. The elimination of this step can reduce scrap generated from extra handling of the part as well as save the labor cost to unrack and rerack the parts. Furthermore, cost may be lowered because the reduced laser ablation time can lead to increased throughput.

The clear non-plateable portion 34 is preferably aligned with the non-plated areas defining the pattern 16 on the front side of the part 10. This alignment allows increased light transmission through the front side of the part 10 and allows the openings through the metal layer 14 on the front side of the part 10 to be properly illuminated. Put another way, light from the light source 18 will be sufficiently be transmitted through portions 34 and 32 (which combine to define the overall transmissive plastic body 12) such that the light will shine through the patterns 16.

Figure 10:
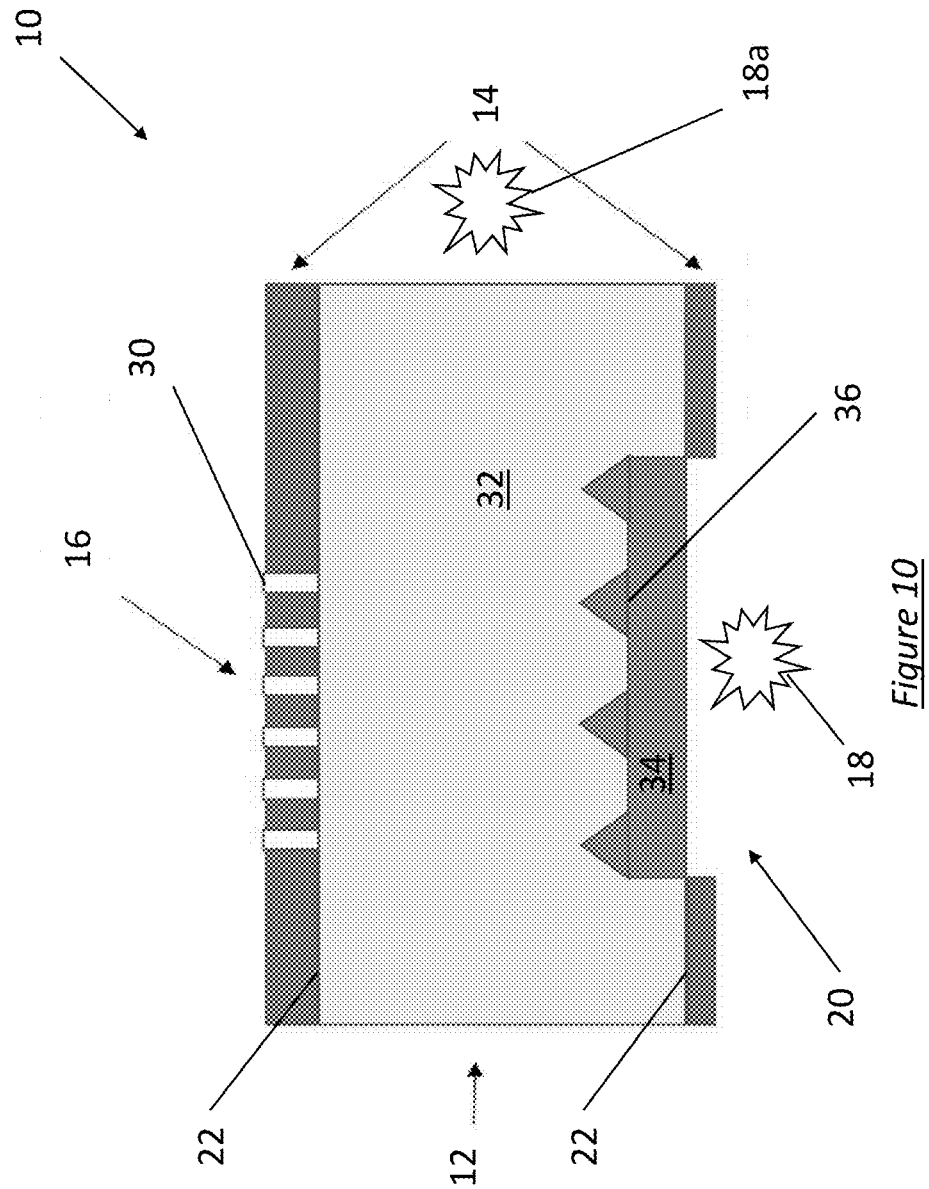
FIG. 10 is cross-sectional view of an alternative illumination arrangement of a plated part according to an aspect of the disclosure.

In another aspect, shown in FIG. 10, part 10 may optionally, or alternatively, include a second light source 18a disposed laterally adjacent a side surface of the part 10. As shown in FIG. 10, the side surface of the part 10 is non-plated, such that light from the second light source 18a may be transmitted through the light-transmissive body portion 12 (including plateable portion 32) and through the part 10. The part 10 may further include reflectors 36 disposed adjacent the non-plateable portion 34. The reflectors may also be referred to as interrupters. FIG. 10 shows the reflectors 36 having a triangular shape and extending upwardly from the non-plateable portion 34. It will be appreciated that other shapes and arrangements sufficient to redirect light may also be used.

In this arrangement, light passing through the body 12 will impact the reflectors 36 and be directed upward toward the patterns 16 on the front side of the part 10 that were created by laser ablation. Thus, the light transmitted through the body 12 can be more specifically focused toward the laser-ablated design 16 on the front surface of the part 10 to improve illumination of the design 16. The second light source 18a may be used in addition to light source 18 or as an alternative to the light source 18.

The reflectors 36 may be formed during the two-shot molding process described above, and may be unitary with the non-plateable portion 34, such that the reflectors 36 and non-plateable portion are co-molded or formed and have a homogenous structure of the same material. In another aspect, the reflectors 36 may be part of a multi-shot molding process and may be introduced following the non-plateable portion 34 and before the plateable portion 32. Put another way, the reflectors 36 may be the same material as the non-plateable portion 34 or may be a different material than the non-plateable portion. In one aspect, the reflectors 36 may be provided without provision of the non-plateable portion 34.

The reflectors 36 may be arranged to reflect light perpendicularly, or they may be arranged to reflect light at other angles depending on the specific arrangement and location relative to the light source 18a. It will be appreciated that the reflectors 36 are arranged based on the specific size and shape of the part 10, the location of the design 16, and the location of the light source 18/18a, with surfaces arranged at an inclination sufficient to reflect the light toward the design 16 based on the position of the light source 18/18a. In one approach, the bare section 20 and light source 18 on the back side of the part 10 may be eliminated, and reflectors 36 may be used with light being transmitted from the side and reflected toward the pattern 16 on the front side.

It is not the intention of this disclosure to highlight all of the possible designs that can be employed nor is it the intention to disclose all possible materials that fit the criteria described above. It should be appreciated that combinations of these embodiments is also possible and the fact these embodiments were not specifically described together does not mean that their combinations are therefore excluded in any way.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Such variations are not to be regarded as a departure from the disclosure, and all such modifications are intended to be included within the scope of the disclosure. Those skilled in the art will recognize that concepts disclosed in association with an example enclosure assembly can likewise be implemented into many other systems to control one or more operations and/or functions. Accordingly, the scope of legal protection afforded this disclosure can only be determined by studying the following claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A decorative component for an automotive vehicle, the decorative component comprising:
    a plateable body portion formed of a plateable resin material capable of being electroplated, wherein the plateable resin material is translucent and light-transmissive;
    an electroless intermediate layer plated on the plateable resin via electroless deposition;
    a pattern having an outline formed in a portion of the electroless intermediate layer;
    an electroplated layer of material defining a surface finish, wherein the electroplated layer of material overlies the electroless intermediate layer in areas outside of the outline, wherein the pattern is defined within the surface finish;
    wherein the outline defines an enclosed shape, wherein the enclosed shape exposes the plateable resin;
    a bare section defined within the surface finish, wherein light is transmitted through the bare section, through the plateable resin material, and through the pattern to illuminate the pattern.

2. The decorative component of claim 1, wherein the outline defines at least one closed loop, and no surface finish is present within the closed loop of the outline.

3. The decorative component of claim 1, wherein the component includes a front side and a back side, wherein the front side includes the pattern and the back side includes the bare section.

4. The decorative component of claim 3, wherein the bare section of the back side is larger than the pattern on the front side.

5. The decorative component of claim 1, wherein the pattern includes multiple outlines defining multiple closed-loops, wherein no surface finish is disposed within the multiple outlines.

6. The decorative component of claim 1, wherein the pattern includes a plurality of features having a width or diameter less than 60 microns.

7. The decorative component of claim 1, further comprising a non-plateable resin portion embedded in the plateable resin body, wherein the non-plateable resin portion is translucent and light-transmissive.

8. The decorative component of claim 7, wherein the plateable resin body is overmolded on the non-plateable resin portion, and the non-plateable resin portion is disposed on the back side of the component and the pattern is disposed on the front side of the component, such that a light disposed adjacent the non-plateable resin portion will illuminate the pattern on the front side.

9. The decorative component of claim 7, wherein the metal layer and surface finish does not cover the non-plateable resin portion.

10. The decorative component of claim 1, wherein the pattern includes openings through the metal layer of various sizes or shapes.

11. The decorative component of claim 1, further comprising at least one reflector embedded within the body portion, wherein the reflectors are configured to reflect light transmitted through the body toward the pattern to illuminate the pattern.

12. A method of making a decorative component, the method comprising:
    providing a plastic plateable resin body portion that is translucent and light-transmissive;
    performing electroless deposition on the body portion and covering the plateable resin body portion with an intermediate layer of material, wherein the intermediate layer is configured to be electroplated;
    ablating the intermediate layer with a laser, wherein the laser defines a pattern, wherein the laser defines an outline that exposes a portion of the body portion through intermediate layer;
    performing an electroplating process on the body portion having the intermediate layer of material;
    during the electroplating process, removing the intermediate material disposed within the outline, wherein the intermediate material within the outline is electrically isolated relative to areas outside of the outline;
    electroplating a metal layer over the areas outside of the outline;
    defining a pattern within the metal layer, wherein the pattern corresponds to the outline define by the laser;
    defining a bare section within the metal layer;
    wherein the pattern exposes the body portion through the metal layer, such that light passes through the bare section and the body portion to illuminate the pattern through the metal layer.

13. The method of claim 12, wherein the pattern is defined on a first side of the body portion, and the bare section is defined on a second side of the body portion opposite the first side, wherein a light disposed adjacent the second side illuminates the pattern on the first side.

14. The method of claim 12, further comprising embedding a non-plateable resin portion in the plateable resin portion, wherein the non-plateable resin portion is exposed and translucent, wherein the electroless deposition does not cover the non-plateable resin portion.

15. The method of claim 12, wherein the component is attached to a plating rack prior to electroless deposition, and the component remains fixed to the plating rack after electroless deposition and through the electroplating.

16. The method of claim 12, wherein the intermediate layer within the outline is electrically isolated from the areas outside of the outline and the intermediate layer within the outline is dissolved by acid during the electroplating process to define the pattern.

17. The method of claim 12, wherein there is no metal layer within the outline following the electroplating process.

18. The method of claim 12, wherein the laser defines the outline of a shape of the pattern and removes a perimeter of the pattern, leaving the intermediate layer within the outline prior to the electroplating, wherein the intermediate layer within the outline is removed after laser ablation during the electroplating.

19. The method of claim 12, wherein the pattern includes multiple outlines defined by the laser and defining multiple closed loops, with multiple electrically isolated portions of the intermediate layer within the closed loops following laser ablation, wherein the areas within the closed loops are dissolved during electroplating to define the pattern.

20. The method of claim 14, further comprising overmolding the plateable resin portion onto the non-plateable resin portion.

21. The method of claim 12, wherein a first side of the component is laser ablated to define the pattern, and a second side of the component opposite the first side is not laser ablated.

22. The method of claim 21, further comprising the step of applying a resist material on the second side of the component prior to performing electroless deposition, wherein surface area covered by the resist material does not receive the intermediate layer of material.

23. The method of claim 12 further comprising applying a clear or tinted coating over at least the front side of the part after electroplating the metal layer.

24. The method of claim 12, further comprising embedded at least one reflector within the body portion, wherein the reflector directs light being transmitted through the body portion toward the pattern formed in the metal layer.

25. The decorative component of claim 1 wherein the component has an intermediate plated state and a finished plated state;
   wherein in the intermediate plated state, a first portion of the electroless intermediate layer is disposed within the outline and is electrically isolated from areas outside of the outline; and
   wherein in the intermediate state light transmits through the outline and is blocked by the first portion of the electroless intermediate layer within the outline and by the areas outside of the outline.

26. A decorative component for an automotive vehicle, the decorative component comprising:
   a plateable body portion formed of a plateable resin material, wherein the plateable resin material is translucent and light-transmissive;
   a conductive intermediate layer including metal deposits plated on the plateable resin via electroless deposition;
   a pattern defined within a closed loop perimeter, the closed loop perimeter formed on a front surface of the body portion within a portion of the conductive intermediate layer;
   an electroplated layer of material defining a surface finish, wherein the electroplated layer of material overlies the conductive intermediate layer in areas outside of the closed loop perimeter;
   wherein the component includes a partially plated state, in which the closed loop perimeter fully exposes the light transmissive plateable resin along the closed loop of the perimeter but not within areas within the closed loop perimeter, and a continuous portion of the electrolessly plated conductive intermediate layer is disposed within the fully light transmissive closed loop perimeter, wherein the continuous portion of the electrolessly plated conductive intermediate layer is removable via dissolution during an acid step of an electroplating process, such that light passing through the light transmissive plateable resin will fully illuminate the pattern defined within the closed loop perimeter, as well as the closed loop perimeter, following the dissolution of the continuous portion.

* * * * *